United States Patent [19]

Courier de Mere

[11] Patent Number: 5,010,277
[45] Date of Patent: Apr. 23, 1991

[54] ELECTRONIC CONVERTER SUPPLIED BY AN ALTERNATING CURRENT DISTRIBUTION NETWORK

[76] Inventor: Henri Courier de Mere, Les Berruries, Mettray, France, 37390

[21] Appl. No.: 494,980

[22] Filed: Mar. 16, 1990

[51] Int. Cl.$^5$ .......................................... H05B 37/02
[52] U.S. Cl. ................................ 315/200 R; 315/205; 315/225; 315/226; 315/307; 315/DIG. 7
[58] Field of Search ................. 315/200 R, 205, 208, 315/209 R, 224, 225, 226, 291, 307, DIG. 2, DIG. 5, DIG. 7

[56] References Cited

U.S. PATENT DOCUMENTS

| 4,104,715 | 10/1978 | Lawson, Jr. | 315/DIG. 5 |
| 4,109,307 | 10/1978 | Knoll | 315/DIG. 7 |
| 4,184,128 | 1/1980 | Nilssen | 315/DIG. 2 |
| 4,188,650 | 2/1980 | Knoll | 315/DIG. 7 |
| 4,382,212 | 5/1983 | Bay | 315/DIG. 7 |
| 4,700,287 | 10/1987 | Nilssen | 315/DIG. 7 |

Primary Examiner—Robert J. Pascal
Attorney, Agent, or Firm—Eckert Seamans Cherin & Mellott

[57] ABSTRACT

The invention relates to an electronic converter for supplying a constant amplitude output voltage while taking from the main supply only a sinusoidal current in phase with the voltage. This device is constituted by an auto-oscillator comprising transistors 7a and 7b for which the duty cycle is automatically regulated, a first inductance 10 constituting an oscillator circuit to which the output energy is evacuated, and second inductance taking off part of the high frequency energy produced to reapply it, after rectification, in series with the mains voltage rectified by the bridge 13, so that the voltage between the common polarized terminals of the auto-oscillator becomes continuous and held at a potential at least equal to the peak mains voltage, which translates into a continuous output voltage envelope. This device is applicable to the production of electronic transformers, power supplies, electronic ballasts, etc., without necessarily requiring electrolytic smoothing capacitors.

13 Claims, 2 Drawing Sheets

ELECTRONIC CONVERTER SUPPLIED BY AN ALTERNATING CURRENT DISTRIBUTION NETWORK

BACKGROUND OF THE INVENTION

The present invention relates to electronic devices of the "bridge converter" type, which, supplied from an alternating network, are capable of supplying, at the output, a variable impedance load, such as a discharge lamp.

Known devices of this type are numerous and have been described, notably, in the following patents: PCT WO-83/00587; Europe 0,062,276; 0,075,176; 0,156,439 and 0,259,646; U.S. Pat. No(s). 4,104,715; 4,109,307; 4,184,128; 4,188,660; 4,382,212 and 4,700,287; Federal Republic of Germany 3112281; 3312575 and 3445817; Great Britain 2,061,037; France 76,31038 and 87,18567.

After having constructed and tested each of these devices for which the manufacture is sometimes complex, it has been inevitable to conclude that, for example, in the case of U.S. Pat. No. 4,109,307 or FR-87.18567, if the current taken from the network is strictly sinusoidal, on the contrary, the voltage applied at the output to the load is very strongly modulated by the rectified mains component.

In the case of certain others of these devices, inversely, this modulation of the output voltage is reduced by means of an electrolytic filtering capacitor which, in spite of the presence of a strong ferromagnetic input filter, brings about an unacceptable harmonic distortion of the mains current.

Thus, such apparatus do not allow an ideal interface to be provided between an alternating network and any load requiring a constant amplitude operating voltage without, for as much, affecting the sinusoidal nature of the input current such as its power factor.

Furthermore, such latter devices, by having recourse to an electrolytic smoothing capacitor can only offer an M.T.B.F. (mean time between failures) which is very limited and a reduced life at the operating temperatures of such a product.

SUMMARY OF THE INVENTION

The object of the present invention is the elimination of all these disadvantages as well as the provision at low cost of a mains/load interface capable of extracting from the network only a strictly sinusoidal current, which is in phase with the voltage, while the residual modulation of the voltage applied to the load is negligible, this without having recourse to a large ferromagnetic input filter nor to an electrolytic capacitor for which the failure rate during storage and at high temperatures can become unacceptable for numerous applications.

To obtain this result, the device, which is the object of the invention, comprises a bridge type auto-oscillator provided with automatically controlled switching means such that the energy contained in each pulse that they generate is inversely proportional to the absolute value of the rectified mains voltage, which is applied between the polarized supply terminals of the said bridge-type auto-oscillator for which the non-polarized midpoints are interconnected, on the one hand with the first inductance for ensuring the evacuation of the high frequency energy used at the output; and on the other hand, a second inductance for taking off a portion of the high frequency energy produced so as to add it, after rectification, in series with the rectified mains voltage without filtering its low frequency component. The control of the said switching means is ensured by micro-inductors coupled directly or indirectly to the first inductor such that their coordinated conduction is ensured. Optionally, a second portion of the high frequency energy can be taken off from the first inductor and added after rectification to the resultant of the voltages already added, such that the voltage developed between the common polarized terminals of the bridge-type auto-oscillator is, in all practical cases, at least equal to the peak mains voltage, that is to say 1.414 X Vnom, at the minimum.

The above-mentioned first inductor can be in the form of a simple winding, an isolation transformer or an auto-transformer, associated with a capacitor; it constitutes the oscillator circuit, which in either series resonance or parallel resonance mode, regulates the working frequency of the auto-oscillator bridge.

In the same way, the second inductor can be in the form of a simple winding, an isolation transformer or an auto-transformer, and according to the choice made, the high frequency energy added after rectification of the mains voltage is added either by means of a capacitor supplying a voltage doubler bridge connected in series with the mains rectifying bridge or by means of a standard rectifier bridge. The high frequency decoupling of the common polarized terminals of the auto-oscillator bridge is carried out by means of at least one capacitor of sufficient capacitance, which is associated with a capacitor of low capacitance shunting the polarized outputs of the mains rectifier bridge. The structure of the auto-oscillator bridge which is used can be of the full bridge type, half bridge capacitor type, or asymmetric bridge type. Other structures can be envisaged, such as a "push pull" arrangement or the like.

The device thus constituted permits, by using at the input of the auto-oscillator bridge only a decoupling capacitor having a low value, which is compatible with the standard plastic film capacitors, a perfect smoothing of the modulation at 100 Hz or 120 Hz of the voltage applied to the said input to be obtained, while the current taken from the network remains strictly sinusoidal. Owing to the fact that this voltage is artificially maintained continuous, the envelope of the output voltage applied to the said load has constant amplitude in spite of its impedance variations. In the case where the device, the object of the invention, is used to supply to the said load a continuous voltage of selected amplitude, the high frequency energy available at the output of the auto-oscillator within a continuous envelope is applied to the input of the rectified means having an inverse short recovery time for which the polarized outputs are decoupled by a low value capacitance. The continuous smooth voltage is thus available between the terminals of the said capacitor without recourse to bulky electrolytic capacitors normally used in order to attenuate the residual mains modulation. This permits therefore a gain in reliability, output, size and retail cost relative to all the devices known in the prior art.

In the case where the device, the object of the invention, is used to supply a load for which the impedance is not defined, such as a gaseous discharge, the high frequency energy available at the output of the auto-oscillator can then, in this case, be directly applied with a view to obtaining a arc current which is perfectly stable and without any residual mains modulation, which, for example, for a low pressure fluorescent lamp, allows all the undesirable stroboscopic effects to be eliminated, while taking from the mains supply only a strictly sinusoidal current, which is in phase with the voltage.

DESCRIPTION OF THE PREFERRED EMBODIMENT

Figure 1:
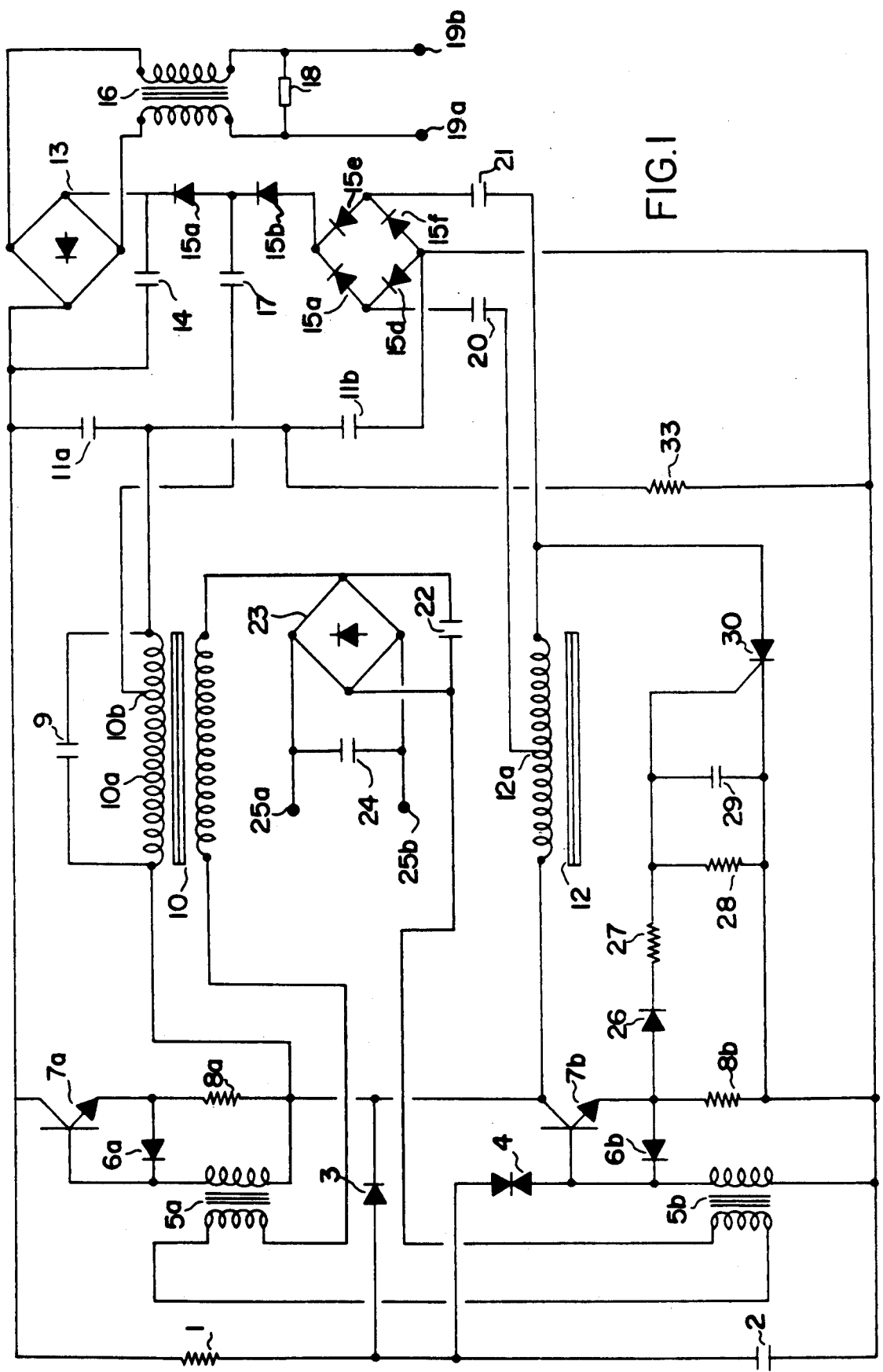
FIG. 1, attached hereto, represents one embodiment of the device, the object of the invention, for supplying direct current.

The structure of the convertor used is of the half-bridge type and comprises, in its first branch, transistors 7a and 7b mounted in series and in its second branch capacitors 11a and 11b mounted in series. One can obviously use other structures making use of other types and numbers of switching means. Thus, there could be used, in accordance with the device, the object of the invention, the following types of convertors: non-isolated voltage reduction auto-oscillator, non-isolated voltage increaser or non-isolated voltage reducer-increaser, isolated partial or complete demagnetization accumulator auto-oscillator, direct isolated auto-isolator, direct asymmetric half-bridge auto-oscillators, push pull auto-oscillator, either half-bridge or full bridge provided with bipolar transistors, FET's or thyristors. The non-polarized mid points of this half-bridge are connected together by the primary 10a of the transformer 10 for which the secondary 10c, associated with capacitor 22, behaves as a parallel oscillating circuit. In order that the alternating conduction of the transistors 7a and 7b should be continuous and that the circuit behaves as an auto-oscillator, the primary windings of the micro-control inductors 5a and 5b, suitably oriented are connected in series with the above mentioned oscillator circuit comprising the secondary 10c and the capacitor 22, itself suitably oriented. The secondary windings of the micro-inductors 5a and 5b suitably oriented, have one of their outputs connected to the control electrode of the transistor in question, the other output being connected to one of the resistors 8a or 8b connected to the emitter of the said transistor, such that the current coming from one of the said micro-inductors flows through the series circuit comprising one of the third resistors 8a or 8b and the base-emitter gap of the transistor in question. The diodes 6a and 6b, suitably polarized, are connected respectively in parallel with the base-emitter junction of the transistors 7a and 7b, so that the positive voltage developed by an excess of current through the resistors 8a and 8b can be reapplied to the control electrode in question, which has the result of inhibiting the current coming from the micro-inductor in question and reducing the conduction time of the transistor in question: regulation of the conduction cycle of the transistors is thus assured.

The diodes 6a and 6b, thus connected, have a second function: they replace the freewheeling diodes conventionally connected between the collector and emitter of each transistor. In effect, associated in series with the base-collector junction of each transistor they permit the counter flow of current by using the inverse transistor.

The micro-inductors 5a and 5b consist of enamelled wire windings wound on small rings or ferrite tubes of a few millimeters in diameter and length.

The polarized branches of the auto-oscillator thus constituted are supplied by the rectified mains current supplied by the polarized outputs of the rectifier 13 for which the non-polarized inputs are connected to the mains supply through the filter HF 16 intended to bring about the rejection of high frequency interference on the line. An element sensitive to voltage 18 absorbs the transient over voltages exceeding a predetermined threshold. The rectified current from the rectifier bridge 13a can rejoin the polarized branch of the said auto-oscillator bridge through the half-bridge doubler 15a/15b mounted in series with the two parallel half-bridge doublers 15c/15d and 15e/15f. Given the tight coupling existing between the above mentioned secondary 10 c and primary 10a, if all the windings in question are suitably oriented, after initiation of the conduction of one of the transistors, the alternating conduction of the latter can thus be maintained in a stable manner by simple feedback.

The initiation of the conduction of one of the transistors is ensured by the pulse discharge circuit constituted by the capacitor 2 associated with the diac 4 and the resistance 1, such that when the charge on the capacitor 2 has reached the triggering voltage of the said diac, the pulse supplied at the base of the transistor 7b triggers the momentary conduction of the latter, bringing about the entry into service of the third auto oscillator. The diode 3 has for its role to discharge the capacitor 2 at each switching made by the transistor 7b in order to eliminate the risk of the untimely application of pulses to the base of the transistor in the off mode.

The useful energy supplied by the said thus constituted auto-oscillator is recoverable between the terminals of the capacitor 22 to which are connected the inputs of the rectifier bridge 23 of which the output characteristics at high frequency are chosen such that the losses are negligible. The polarized outputs 25a and 25b of this bridge are also decoupled by the capacitor 24 from the terminals at which the rectified current is available.

As has been described, the auto-oscillator has the advantage of simplicity, of excellent galvanic isolation (input/output) and above all the possibility of tolerating a wide deviation in the conduction time of the switching means.

Nevertheless, in this embodiment, it delivers a rectified current strongly modulated by the mains component for which the smoothing would require the use of high value electrolytic capacitors, which bring about the unacceptable deterioration in the form factor of the current taken off the network unless one has recourse to a large ferromagnetic input filter.

In order to correct this modulation by the mains component of the output signal, part of the high frequency energy produced by the above mentioned auto-oscillator is taken off the non common terminal of the output switching means to be rectified and reinjected in series into the rectified mains voltage circuit so that, by being added together, these two voltages allow the voltage present between the polarized terminals of the auto-oscillator either to be equal to the peak of voltage delivered by the mains supply. To this end, the inductor 12 is connected at the mid point of the branch of the bridge constituted by the transistors 7a and 7b and the capacitors at 21, which charges the diodes 15e and 15f mounted as a voltage doubler. This doubler bridge, suitably polarized permits the addition of the thus rectified voltage to the rectified mains voltage, as indicated above.

It is important to note that the inductor 12 associated with the capacitor 21 must not constitute a series oscillator circuit for which the resonant frequency is too near that of the output circuit comprising the secondary 10c and the capacitor 22. To this end a take off is effected at the inductor 12 and connected to the capacitor 20, which supplies a second voltage doubler bridge comprising diodes 15c and 15d. This second doubler bridge delivers a rectified voltage which is, it also, added to the rectified main supply, parallel to the voltage rectified by the diodes 15e and 15f. This addition can also be affected in series with the bridge consisting of diodes 15e and 15f. Thus, this voltage supply, in series with the mains, is produced in an aperiodic manner.

It is obvious that the inductor 12 could be replaced by a transformer for which the primary would be connected in parallel with the primary of the transformer 10, its secondary supplying a doubler bridge or not capable or ensuring the above mentioned voltage addition.

In these conditions, an auto compensation of the modulation of the rectified current applied to the polarized terminals of the above mentioned auto oscillator is realized without detrimentally affecting the sinusoidal nature of the current taken from the main supply, even if the capacitors 11a and 11b have very high values and are of the electrolytic type, for example:

To perfect the demodulation of the resultant of the voltages thus added, while improving the linearity of the input current, during variations in the mains input voltage, it is useful to extract by means of the terminal 10b of the primary 10a, a fraction of the voltage developed between its terminals and reapply it, via the capacitor 17 and the voltage doubler bridge comprising diodes 15a and 15b, in addition to the resultant of the previously realized voltage.

To this end, this reinjection can also be carried out from a separate winding of the transformer 10. Furthermore, it is also obvious that the transformer 10 can be in the form of a simple inductor or an auto transformer. In the case of the isolated inductor, the oscillator circuit necessary for the operation of the auto-oscillator would be of the series type, the output load being connected, itself, in series with the said oscillator circuit.

In the case where the transformer 10 would be reduced to an auto transformer or a simple inductance, the benefit of galvanic isolation between the output load and the main supply obviously no longer exists.

It remains to resolve the problem of the interruption of the auto-oscillator in the case of absence of load, of overload and of short circuit at the output: This is the object of the complimentary circuit described hereafter.

This circuit comprises the diode 26 associated with the divider bridge comprising the resistors 27 and 28, which adjust the potential at the terminals of the capacitor 29 such that the voltage taken from the terminals of the resistor 8b, which is the image of the peak current switched by the device, triggers at a predetermined threshold the conduction of the cathode trigger of the thyristor 30 or of an equivalent component. The conduction of the said thyristor thus established creates momentary short circuit of the auto oscillator bridge, which is current limited by the impedance of the inductor 12 connected between its anode and the mid point of the branch of the said bridge comprising the transistors 7a and 7b. Under these conditions, the device ceases to oscillate. Due to the presence of the resistor 33 connected between the mid point of the capacitors 11a and 11b and one of the branches of the auto oscillator bridge, a low voltage subsists at this mid point. This voltage is sufficient to maintain, via the primary 10a and inductance 12, a current greater than the maintenance current required by the thyristor 30 for which the conduction can thus be maintained such that the supply by the mains is not interrupted. This device provides perfect security for any type of auto oscillator overload, which is an additional guarantee as to the reliability of the device, the object of the invention.

By replacing the resistance 27 by an NTC (negative temperature coefficient) type, it is possible to use the device as a thermal circuit interrupter, the predetermined threshold being lowered in case of a given increase in operating temperature. To this end it would be possible to replace the resistor 28 or the resistor 8b by a PTC (positive temperature coefficient) type, the effects being the same as above.

As described, the device, the object of the invention, by using an auto oscillator having an conduction cycle for the switching means that can vary over a large range, supplies the polarized inputs of the said auto oscillator with a continuous demodulated voltage greater or equal to the peak alternating mains voltage, this ensuring a perfectly smooth output potential while the current taken from the network remains perfectly sinusoidal and in phase with the voltage. Due to this fact, in the majority of applications, the use of electrolytic smoothing capacitors is not necessary, which permits a product having an MTBF and a life so far unknown to be produced, which is also truly solid state.

Figure 2:
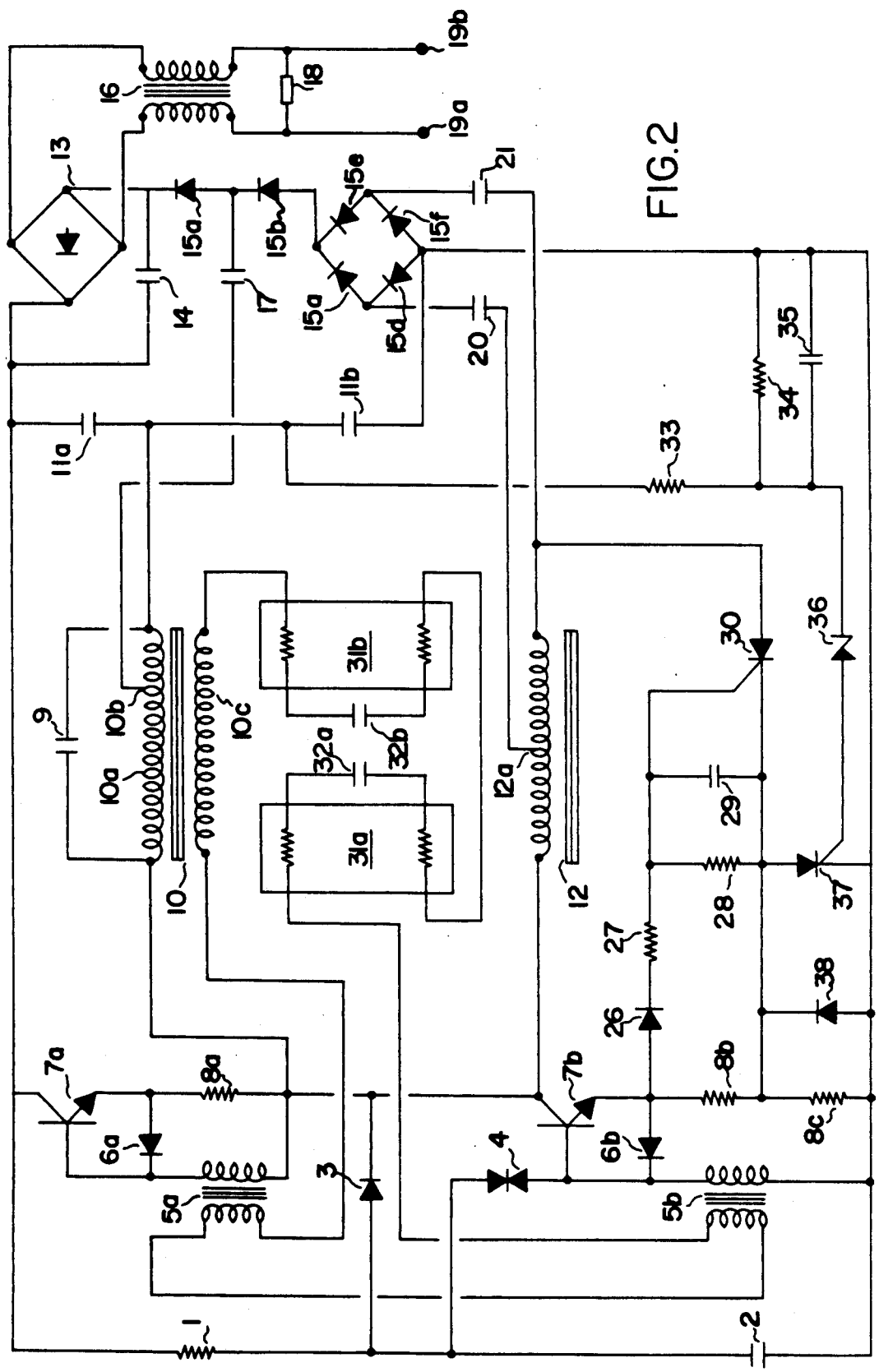
FIG. 2, attached hereto, represents the device, the object of the invention, in one of its principle applications, the supply of fluorescent lamps.

FIG. 2, attached hereto, represents the device, the object of the invention, in one of its principle applications, the supply of fluorescent lamps.

The circuits shown here are identical to those that have just been described above, with the exception that the output load is no longer the same: the capacitor 22 is replaced by the capacitors 32a and 32b mounted in series with the cathode filaments of the lamps 31a and 31b such that each of the said capacitors is connected in parallel with the arc space of each of the said lamps, which are connected, in series between one of the terminals of the winding 10c and the free terminal of the series circuit comprising primaries of the micro inductors 5a and 5b as well as a secondary 10c.

Under these conditions, the device, the object of the invention, operates as described above: The lighting of the lamps is instantaneous, this being due to the over voltage registered when the lamp, before firing, has a practically-infinite impedance, which does not dampen the resonance of the oscillator circuit comprising the capacitor 32a and 32b associated with the secondary 10c.

This output configuration is interesting, because by disconnecting one of the lamps, the breaking of the conduction of the secondary circuit thus obtained permits the operation of the auto-oscillator to be interrupted and to limit to a practically negligible value the consumption from the main supply during this time.

To restart the device, it is sufficient to replace the lamp, which after a new discharge of the capacitor 2 through the diac 4, reestablishes the oscillation in the above mentioned oscillator circuit.

It is of course obvious that to supply single pin lamps, the capacitor 22 suffices, but in this case, on disconnection of one of the lamps, an over voltage of too long duration between the terminals of the secondaries 10c would induce an over current in the resistor 8b, which would trigger the security device described above.

The output configuration shown here corresponds to a very general application, but it is of course obvious that other arrangements of lamps are possible: single lamps, parallel lamps.

Concerning the application of the device, the object of the invention, for this use, a problem remains, namely that of the preheating of the cathode filaments before a stable triggering of the arc current. This problem is resolved here in a simple and economic manner by the supplementary circuit described hereafter.

This circuit comprises the resistor 8c mounted in series with the resistor 8b. This resistor, having a chosen value, limits, on starting of the auto oscillator, the amplitude of one of the half cycles supplied to the said oscillator circuit such that the firing voltage of the lamps cannot be attained while ensuring a sufficient current in the capacitors 32a and 32b and as well in the filaments of the lamps. The thyristor 37 or any equivalent element is connected in parallel with the resistor 8c, as well as a freewheeling diode 38. When voltage is applied to the device, the thyristor 37 is in the blocked state while its trigger circuit consisting of resistors 33 and 34 mounted as a bridge and associated with the capacitor 35 and Zener diode 36 charges up. As soon as the capacitor 35 has reached the threshold potential of the Zener diode 36, a current flows through the trigger cathode space of the thyristor 37 which becomes conductive and short circuits the resistor 8c, which as a consequence the reestablishment of the normal characteristics of auto-oscillator, and consequently, the firing of the lamps. The time constant for charging the capacitor 35 to the required voltage is chosen to be in the order of one second, the optimal cathodic preheating time.

Such a device permits the voltage to be limited before triggering to a value defined by standard and allows a very short glow arc transition time to be obtained, which is a guarantee of longevity for the lamps used. In order that the reliability of the device, the object of the invention, may be optimized, it is preferable to use for the capacitors 29 and 35 solid $MnO_2$ electrolytic types for which the MTBF and life are untouchable between $-55°$ C. and $+125°$ C.

The device, the object of the invention, is simple and not onerous to construct and offers an unquestionable reliability. It allows a perfect interface to be realized between an alternating mains supply and a load which can be supplied without mains modulation while the current taken from the network remains perfectly sinusoidal and in phase with the alternating input voltage.

It permits the use of electrolytic smoothing capacitors to be avoided, which are bulky and of doubtful reliability both at high and low temperatures.

The device, the object of the invention, can be used in any case where it is required to supply with demodulated direct current and apparatus, to maintain the operation of a fluorescent lamp or a discharge tube, without adversely affecting the sinusoidal nature of the current taken from the network.

It goes without saying, and it follows from the above, that the invention is in no way limited to the modes of application and realization which have been more particularly envisaged. It encompasses, on the contrary, all variations.

The embodiments of the invention in which an exclusive property or privilege is claimed are defined as follows:

1. Electronic device for the conversion of energy supplied by a low frequency alternating mains voltage supply, rectified but not filtered, comprising a high frequency oscillator provided with switching means for which the conduction duty cycle is automatically maintained inversely proportional to the instantaneous value of the said rectified voltage, this oscillator being provided, at the output, with an oscillator circuit provided with a first inductor for matching the impedance of the load used to that of the said oscillator, characterized by the fact that a second inductor 12 derives a portion of the high frequency energy extracted by the said switching means so that, after rectification, the voltage thus obtained, suitably polarized, is added to the above mentioned rectified mains voltage, thus permitting an average resulting voltage to be obtained, which is at least equal to the peak voltage developed by the said mains supply, and additionally, another portion of the high frequency energy is extracted from the above mentioned oscillating circuit and after rectification, the voltage thus obtained suitably polarized is also applied in series with the rectified mains voltage, this, in order to perfect the low frequency demodulation of the rectified supply voltage of the said oscillator and to improve the linearity of the current taken from the mains supply in case of major variations in the nominal voltage of the mains supply, being such that, definitively, by means of the automatic control of the conduction cycle of the said switching means, the supply voltage of the said oscillator becomes continuous, without detrimentally affecting the sinusoidal nature of the mains supply current, this having as the final consequence the supply of the above mentioned load, having a stable or otherwise impedance, such as the series of discharge lamps 31a and 31b with a voltage for which the envelope is maintained continuous, without for as much, requiring necessary recourse to high capacitance electrolytic smoothing capacitors.

2. A device according to claim 1 characterized by the fact that the inductors 10 and 12 can be either in the form of a simple inductor or in the form of an autotransformer or in the form of an isolation transformer.

3. A device according to claim 1 or claim 2, characterized by the fact that the reinjection of the above mentioned portion(s) of high frequency energy is carried out, either by means of the terminals 10b or 12a, respectively provided on a winding of the inductors 10 or 12, and that the rectification of the said high frequency energy is obtained by means of voltage doublers comprising respectively, either a capacitor 20 associates with diodes 15c and 15d, or a capacitor 21 associated with diodes 15e and 15f, or both at once, and additionally a capacitor 17 associated with diodes 15a and 15b.

4. A device according to claim 2, characterized by the fact that the reinjection of the above mentioned portion(s) of high frequency energy is carried out by means of independent windings coupled respectively to the inductor 10 and the inductor 12 and that the rectification of the said high frequency energy is obtained by means of rectifier bridges for which the polarized outputs, suitably oriented, are connected in series with the mains rectifier bridge 13.

5. A device according to claim 1, claim 2 or claim 3, characterized by the fact that the above mentioned oscillator is of the half-bridge type provided with, in one of its branches, transistors 7a and 7b, and in the other of its branches capacitors 11a and 11b which, in association with the capacitor 14, ensure the decoupling of the common polarized terminals of the said bridge, a parallel oscillator circuit fixing the oscillation period of the said oscillator being constituted by the secondary 10c associated with the capacitor 22.

6. A device according to claims 1, 2, 3, or 4, characterized by the fact that the parallel oscillator circuit comprising the secondary 10c, associated with the condenser 22, is connected across the load connected at the output via the series circuit constituted by the primaries, suitably orientated of the control micro-inductors 5a and 5b, such that after initiation of the oscillations due to the circuit comprising the diac 4, the resistor 1, the condenser 2 and the diode 3, the operation of the oscillator bridge is maintained in a stable manner.

7. A device according to claim 5, characterized by the fact that the secondary of each micro-inductor 5a and 5b, suitably oriented, is respectively connected through the first of its terminals to the control electrode of the transistor in question, and through the second of its terminals to the common terminal of a resistor for which the other of its terminals is connected to the common electrode of the transistor in question, a diode 6a or 6b being connected in parallel with the base-emitter space of the transistor in question, so that when the threshold is passed, the voltage developed at the terminals of the resistor 8a or 8b is in opposition to the signal coming from each of the said micro-inductors, this ensuring control of the conduction time of each of the transistors 7a or 7b as a function of the current flowing through them at the instant in question, this current depending on the instantaneous voltage applied between the common polarized terminals of the said bridge, this inducing a general self regulation of the voltages developed by the device.

8. A device according to claim 4, claim 5 and claim 6, characterized by the fact that the high frequency energy available at the terminals of the capacitor 22 is applied to the input of a rectifier bridge 23 for which the output, decoupled by the capacitor 24, charges under direct voltage the terminals 25a and 25b to which is connected the load to be supplied.

9. A device according to claim 4, claim 5 and claim 6, characterized by the fact that the capacitor 22 is replaced by the capacitors 32a and 32b mounted in series with the cathode filaments of the lamps 31a and 31b, such that each of the said capacitors is connected in parallel with the arc space of each of the said lamps, which are connected in series with the secondary 10c and the primaries of the micro-inductors 5a and 5b, the latter being connected in series so that by disconnecting one or other of the said lamps, the discontinuance of the operation of the auto-oscillator is automatically brought about, its restarting being ensured by the simple reconnection of the lamp in question, after a new discharge of the capacitor 2 through the diac 4.

10. A device according to claim 6, characterized by the fact that a circuit sensitive to the voltage developed between the terminals of the resistors 8a or 8b, comprising for example the diode 26, the resistors 27 and 28 as well as the capacitor 29, ensures the triggering of the thyristor 30, for a predetermined current value switched by the transistors 7a and 7b, this triggering interrupting, in a stable manner, the oscillator bridge.

11. A device according to claim 8 and claim 9, characterized by the fact that to ensure the cathodic preheating of the lamps 31a and 31b, a resistor 8c is connected in series with the resistor 8a or 8b, such that the auto-oscillator can only supply at its output a voltage sufficient to start the said lamps while the conduction of the semi-conductor 37 shunting the said resistor 8c has not occurred, this occurring after a predetermined time thanks to a time circuit comprising, for example, the resistors 33 and 34 associated with a capacitor 35 and the threshold element 36.

12. A device according to claim 9, characterized by the fact that the above mentioned sensitive circuit can in addition trigger itself at a predetermined temperature threshold, the latter being obtained by the replacement of the resistor 27 by a NTC resistor or the replacement of the resistor 28 or 8b by a PTC resistor.

13. A device according to claims 1 to 11, characterized by the fact that a double inductor 16 is connected between the mains supply and the device with a view to limiting the high frequency interference on the network, a bidirectional element sensitive to a given voltage threshold being connected between the mains terminals 19a and 19b so as to suppress the transient overvoltage pulses.

* * * * *